(12) United States Patent
Pham

(10) Patent No.: US 12,133,210 B2
(45) Date of Patent: Oct. 29, 2024

(54) DYNAMICALLY CONTROLLED SATELLITE HUB AND METHOD OF OPERATION

(71) Applicant: Government of the US as Rep by the Sec of AF, Wright Patterson Air Force Base, OH (US)

(72) Inventor: Khanh Dai Pham, Albuquerque, NM (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 533 days.

(21) Appl. No.: 17/305,381

(22) Filed: Jul. 6, 2021

(65) Prior Publication Data
US 2022/0039095 A1 Feb. 3, 2022

Related U.S. Application Data

(60) Provisional application No. 63/051,972, filed on Jul. 15, 2020.

(51) Int. Cl.
| | | |
|---|---|---|
| *H04W 72/044* | (2023.01) | |
| *H04W 72/21* | (2023.01) | |
| *H04W 72/23* | (2023.01) | |
| *H04W 72/54* | (2023.01) | |

(52) U.S. Cl.
CPC ....... *H04W 72/0473* (2013.01); *H04W 72/21* (2023.01); *H04W 72/23* (2023.01); *H04W 72/54* (2023.01)

(58) Field of Classification Search
CPC . H04W 72/0473; H04W 72/21; H04W 72/23; H04W 72/54; H04W 72/231; H04W 72/232; H04W 72/541; H04W 52/34; H04W 52/346; H04B 7/18513; H04B 7/18517

See application file for complete search history.

(56) References Cited

U.S. PATENT DOCUMENTS

| | | |
|---|---|---|
| 7,949,318 B2 | 4/2011 | Prasad |
| 8,140,070 B2 | 3/2012 | Ashikhmin |
| 9,743,362 B1 | 8/2017 | Tian et al. |
| 9,991,587 B1 | 6/2018 | Freedman |

(Continued)

OTHER PUBLICATIONS

K. D. Pham, "Minimal-cost-variance power control for differentiated service satellite communications," 2016 IEEE Aerospace Conference, Big Sky, MT, USA, 2016, pp. 1-8 (Year: 2016).*

(Continued)

*Primary Examiner* — Ian N Moore
*Assistant Examiner* — Sun Jong Kim
(74) *Attorney, Agent, or Firm* — AFMCLO/JAZ; Larry L. Huston

(57) ABSTRACT

A system comprising an orbiting transponder in bilateral communication with a hub and a plurality of terminals. The hub automatically allocates power to the transponder based upon prequalification criteria, then dynamically adjusts an uplink carrier to noise ratio to prevent loss of weak signals. The system, and method of operation may further minimize variance in uplink adjustments according to a predictive algorithm.

13 Claims, 12 Drawing Sheets

(56) References Cited

U.S. PATENT DOCUMENTS

| | | | |
|---|---|---|---|
| 2007/0206525 A1* | 9/2007 | Miller | H04W 52/146 370/321 |
| 2008/0165875 A1 | 7/2008 | Mundarath | |
| 2010/0091678 A1 | 4/2010 | Chen | |
| 2010/0303002 A1 | 12/2010 | Zorba Barah | |
| 2016/0037456 A1* | 2/2016 | Antia | H04B 7/18517 455/522 |
| 2017/0288769 A1 | 10/2017 | Miller | |
| 2018/0152230 A1 | 5/2018 | Khojastepour | |
| 2018/0152231 A1 | 5/2018 | Jeong | |

OTHER PUBLICATIONS

Cosenza, et al, "Cumulant Control Systems: The Cost-Variance, Discrete-Time Case," 10.1007/978-0-8176-4795-7 , Advances in Statistical Control, 2008, pp. 29-41, USA.

Marshall et al., "SATCOM Loading Analysis with Heterogenous Gain States," IEEE Military communications, pp. 136-141, 2002, USA.

Marshall and Yo, "Non-homogeneous Gain State Optimization for Transponding Satellite Communications," IEEE Military Communications. pp. 517-522, 2008, USA.

Jo, "Optimal Loading of Satellite Systems with Subchannel Gainstate Control," IEEE Transactions on Aerospace and Electronic Systems, vol. 44, No. 2, pp. 795-801, 2008, USA.

Knab, Transponder Power Minimization Utilizing Optimum Channelizer Gains; IEEE Transactions on Aerospace and Electronic Systems, vol. 48, No. 1, pp. 729-736, 2012 USA.

Pham, "Assured Satellite Communications: A Minimal-eosl-variance System Controller Paradigm," American Control Conference, DOI: : 10.1109/ACC.2016.7526701, 2016, USA.

Tian, Pham, et al., "ORA Decisionmaking in a FH Transponded SATCOM System with Advanced RF Situational Awareness—How it Works," IEEE Military Communications Conference, 2019, USA.

X. Tian, G. Chen, K. D. Pham, and E. Blasch, "Joint Transmission Power Control in Transponded SATCOM Systems," IEEE Military Communications Conference, DOI: 10.1109/MILCOM.2016.7795313, Baltimore, MD, 2016.

Pham KD. "Power allocation for shared transponders: A statistical optimal control paradigm." In2018 IEEE Aerospace Conference Mar. 3, 2018 (pp. 1-10). IEEE.

K. D. Pham, "Assured Satellite Communications: A Minimal-Cost-Variance System Controller Paradigm," American Control Conference, pp. 6555-6561, DOI: 10.1109/ACC.2016.7526702, Boston, MA, 2016.

K. D. Pham, "Minimal-Variance-Cost Power Control for Differentiated Services Satellite Communications," IEEE Aerospace Conference, pp. 1-8, DOI:10.1109/AERO.2016.7500831, Big Sky, MT, 2016.

K. D. Pham, "Minimal Variance Control of Clock Signals," IEEE Aerospace Conference, pp. 1-8, DOI:10.1109/AERO.2016.7500498, Big Sky, MT, 2016.

L. Cosenza, M. K. Sain, R. W. Diersing, and C.-H. Won, "Cumulant control systems: the cost-variance, discrete-time case," Advances in Statistical Control, Algebraic System Theory, and Dynamic System Characteristics, C.-H. Won et al. (eds), Birkhauser Boston, DOI: 10.1007/978-0-8176-4795-7, 2008.

G. Giorgi and C. Narduzzi, "Performance Analysis of Kalman-Filter-Based Clock Synchronization in IEEE 1588 Networks," in IEEE Transactions on Instrumentation and Measurement, vol. 60, No. 8, pp. 2902-2909, Aug. 2011, doi: 10.1109/TIM.2011.2113120.

K. D. Pham, "Control Engineering for Hybrid Ground and Space Precoding in Multi-Gateway Multi-Beam Satellite," 2021 IEEE Aerospace Conference (50100), 2021, pp. 1-9, doi: 10.1109/AERO50100.2021.9438378.

K. D. Pham, "Risk-Sensitive Rate Correcting for Dynamic Heterogeneous Networks: Autonomy and Resilience," 2020 IEEE Aerospace Conference, 2020, pp. 1-10, doi: 10.1109/AERO47225.2020.9172717.

K. D. Pham, "A Control-Theoretic Approach to Precoding for Multi-Cast Multi-Beam over Satellite," 2020 IEEE Aerospace Conference, 2020, pp. 1-11, doi: 10.1109/AERO47225.2020.9172594.

* cited by examiner

DYNAMICALLY CONTROLLED SATELLITE HUB AND METHOD OF OPERATION

CROSS REFERENCE TO RELATED APPLICATION

Pursuant to 37 CFR 37 C.F.R. § 1.78(a) this application claims priority to and the benefit of U.S. Provisional Patent Application No. 63/051,972 filed Jul. 15, 2020, incorporated herein by reference in its entirety.

GOVERNMENT INTEREST

The invention described and claimed herein may be manufactured and used by or for the Government of the United States of America for all government purposes without the payment of any royalty.

FIELD OF THE INVENTION

The present invention relates to automatic control of uplink/downlink signals for satellite communication and more specifically to automatic control of multiple uplink/downlink signals for satellite communication.

BACKGROUND OF THE INVENTION

Earth orbiting satellites are in daily use. Each such satellite has at least one transponder which communicates with a plurality of ground terminals as directed by a hub or by a system controller within the hub, hereinafter jointly referred to as the hub. The combination of the hub, at least one terminal and at least one transponder is referred to herein as a system.

More particularly, the hub, transponder and terminal communicate via a forward link from the hub to the transponder to the terminal and a return link from the terminal to the transponder to the hub. The portion of forward link from the hub to the transponder and the portion of the return link from the terminal to the transponder are referred to as uplink links. The portion of the forward link from the transponder to the terminal and portion of the return link from the transponder to the hub are referred to as downlink links.

The satellite may facilitate one-way communication or two-way communication. In one-way satellite communications, the signal is uplinked from one terminal to the transponder and downlinked to another terminal. One-way communications are used for radio, television and internet broadcasts, telemetry, tracking and position locating. In two-way satellite communications, each of the terminals can uplink signals to the transponder for downlink to the other terminal. Two-way communications are used for telephone, aerospace communications and mobile communications.

At least one transponder onboard the satellite controls the uplink signals and downlink signals. A typical transponder comprises a low noise amplifier, low power amplifier, frequency translator and transmitting antenna. The transponder amplifies the uplink signal and modifies the frequency for downlink, to prevent crosstalk. There are two basic types of satellite transponders. A bent pipe transponder receives a microwave frequency uplink signal. The bent pipe transponder converts the frequency of uplink signal to RF frequency and then amplifies the uplink signal. The bent pipe transponder can be used for both analog and digital signals. A regenerative transponder performs the same functions as a bent pipe transponder. i.e., frequency translation and amplification. In addition, a regenerative transponder also performs the demodulation of RF carrier to baseband, regeneration of signals and modulation. A regenerative transponder is only suitable for digital signals, but has the advantage of better signal to noise ratio (SNR) and more flexibility in implementation.

The terminals may be stationary or mobile. Terminals may include any or all of personnel, vehicles such as passenger cars and Humvees, UAV's, television antennae, etc. The forward, or downlink signals to the terminal are usable for geopositioning, weather forecasting, direct to home multiplexed digital television signals, video distribution from broadcasters to network operators, VSAT private networks, broadband high speed internet, search/rescue, etc.

The hub is a ground station that transmits data to/from the transponder to a local area network. A typical hub comprises a receiving antenna, a transmitter, and intermediate band pass filter, low noise amplifier, etc. The hub converts the radio frequency (RF) signal to an internet protocol (IP) signal for terrestrial connectivity. The hub is the master station of the satellite network and controls satellite bandwidth allocation. The hub is responsible for all control functions related to obtaining and maintaining access to system communication resources, including terminal logon time synchronization, resource allocation and antenna control. Bandwidth is the data transfer rate or throughput in bits per second. Bandwidth allocation is controlled by assigning different transmission profiles, including power level, waveform, modulation, etc. to different terminals. The hub may be a single unit or may comprise a central hub with remote VSAT hubs.

But the transponder is often a choke point between terminals competing for time, bandwidth and power to effect the return or uplink signals from multiple competing terminals. The current approach to allocating power to the terminals to satisfy the competing needs for uplink signals has not been satisfactory. Power allocation levels are manually adjusted for each terminal, often days in advance. Allocation is based upon perceived priority and expected weather conditions using an open loop batch processing. Such allocation may require dropping one or more of the weakest signals to provide for higher priority terminals. But this process is labor intensive and rarely optimum. Priorities change, weather can be unpredictable and mistakes can occur with manual control. Often the weaker signal cannot maintain a sufficient forward signal downlink rate to the terminal as necessary to sustain video processing. Sometimes the weakest signals cannot be uplinked from the terminal to the transponder at all, resulting in unmet service level agreements or even total loss of communication.

The present invention overcomes these problems by automatically controlling the hub to dynamically allocate power to the terminals using a feedback loop. This arrangement provides the benefits of faster adjustments to competing priorities, standardizing hub/terminal interactions and of minimizing terminal loss or malperformance due to inadequate power availability. By satisfying each terminal with its respective minimum power requirement for its service at the desired performance level, loss of signal uplink from the terminal to the hub is minimized or even eliminated.

SUMMARY OF THE INVENTION

The invention comprises a method for allocating signal resources from a transponder to a plurality of terminals remote therefrom. Particularly, the method comprising the steps of: providing a system comprising a transponder in bilateral signal communication with each of a hub and a first plurality of terminals, downlinking a first plurality of links from the hub to the first plurality of terminals, determining whether or not the system meets prequalification criteria for the for the hub by assessing whether or not the system A) has an adequate link supportability, B) has an adequate downlink CNR to support a transponder loading feasibility and C) has a minimum DCNR total downlink supportability ratio. If yes, then then proceeding to a control algorithm with no step change in a CNR allocation from the transponder, if no, then proceeding to a control algorithm for adjusting a UCNR allocation, wherein the control algorithm allocates power from the transponder without reducing the number of links in the first plurality of links.

DETAILED DESCRIPTION OF THE INVENTION

Figure 1:
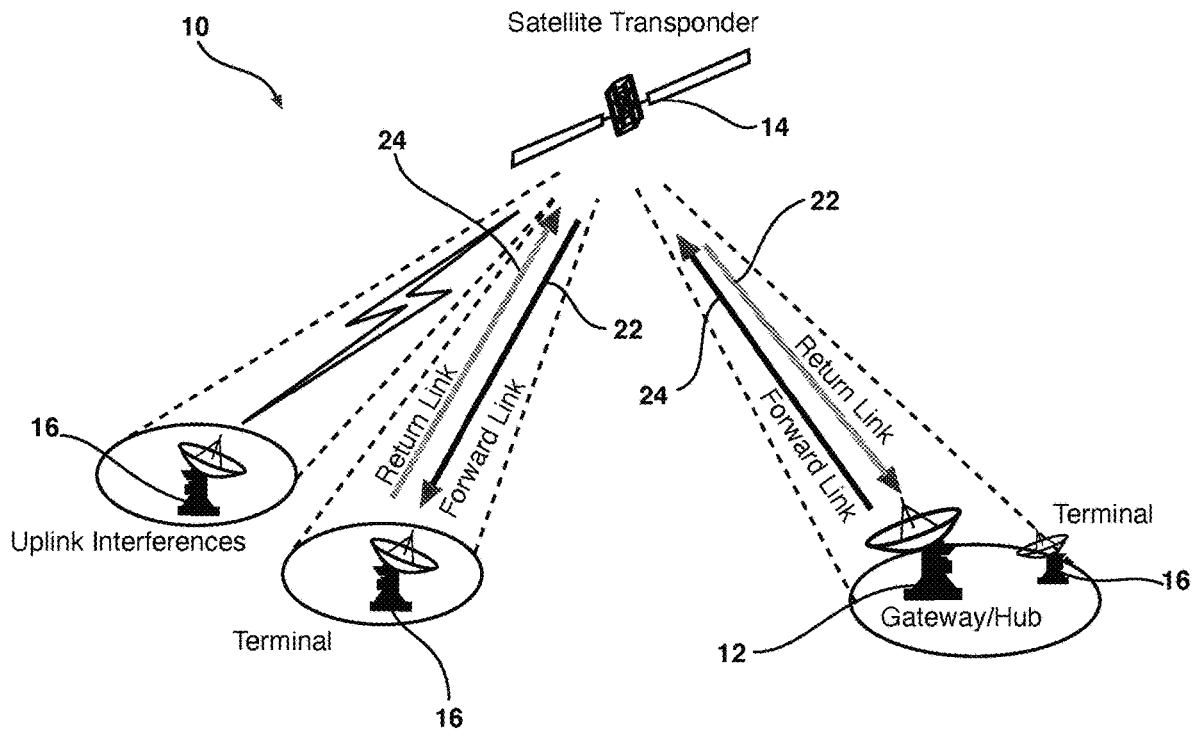
FIG. 1 is a schematic representation of a satellite transponder in mutual communication with multiple terminals and a hub.

Referring to FIG. 1, the system 10 of the present invention comprises one or more transponders 14, terminals 16 and hubs 12. Each of the transponders 14, terminals 16 and hubs 12 transmits its uplink 24 signals and downlink 22 signals through respective antennae. Generally all uplinks 24 will share the same satellite antenna and all return downlinks 22 will share the same hub 12 antenna. Each antenna has an associated transmitting power calculation and a receiving power calculation. The gain of an antenna is defined as the ratio of maximum power flux density of a practical antenna and power flux density of isotropic antenna.

The antenna gain, G in decibels is $G = \Psi_m / \Psi_i$, where, $\Psi_m$ is the maximum power flux density of a practical antenna, and $\Psi_i$ is the power flux density of a theoretical isotropic radiating antenna.

The difference between the power of the signal sent from a transmitter and the power of the signal received at the receiving station is known as a transmission loss. There are two types of transmission losses-constant losses and variable losses. Constant losses are feeder losses, such as antenna misalignment, and occur no matter what precautions are taken. Variable losses include atmospheric absorption due to weather and sky conditions. Downlink 22 signal power may be more limited by antenna and gain considerations than uplink 24 signal power.

Such losses are measurable by the signal carrier to noise density ratios (CNR). These ratios include both uplink 24 CNR (interchangeably referred to as UCNR) and downlink 22 CNR (interchangeably referred to as DCNR), all measured in dB. Bandwidth is measureable in bitrate, i.e. bits per second (bps).

The transponder 14 may transmit simultaneous downlink 22 signals to multiple terminals 16 and receive simultaneous uplink 24 signals from multiple terminals 16 or the hub 12. Three types of multiple access techniques are commonly used to minimize interference between signals: Frequency Division Multiple Access, Time Division Multiple Access and Code Division Multiple Access.

Accordingly, the return link in the disclosed invention provides multiple user access to the hub 12 using multiple frequency time division multiple access (MF-DMA). The return link is channeled into multiple frequency division multiplexing (FDM) channels with each channel supporting time division multiplexing (TDM). The hub 12 controls the process of dynamically allocating return link resources, such as burst modes, modulation, coding types, etc. to terminals 16 and the epoch is the time scale over which resource allocations 50 are made. The return link allocation 50 epoch consists of a number of consecutive days of frames, which are considered to be a system 10 designed parameter, and not further described herein.

Over an allocation 50 epoch t, the communication return access resources of each link includes uplink 24 carrier power to noise ratios, wave forms, etc. The allocation 50 determination is made by the hub 12 in response to information estimation and prequalification 30 processes, by further evaluating a plurality of individual downlink 22 signals from the combined downlink 22 signal. Each downlink 22 signal of the plurality corresponds to a respective one of the uplink 24 signals and to a respective transponded link.

Dynamic access and link supportability for each terminal 16 assigned every allocation 50 epoch are based upon both an estimation of downlink 22 carrier power to noise density ratio for each down link and upon a calculation of an upward density ratio for each uplink 24, based upon the combined carrier power to noise density ratio. The hub 12 runs predetermined pre-qualification processes to determine whether each transponded link is supportable and has the required level of performance by using a required uplink 24 margin, a required downlink 22 margin, the maximum total uplink 24 carrier power to noise density ratio and the maximum total downlink 22 carrier power to noise density ratio associated with the transponded link.

These pre-qualification processes provide for simultaneous treatment of multiple communication return link assignments to be dynamically adjusted to adapt the uplink 24 carrier power to noise density ratios associated with the plurality of transponded links. The hub 12 develops an internal ranking of the weakest transponded link with respect to the largest transponder 14 gain. The transponded link ranking is based upon information in a transponder 14 gain associated with each uplink 24, via the maximum uplink 24 carrier power to noise density ratio, the required uplink 24 margin, the minimal downlink 22 carrier power to noise density ratio and the required downlink 22 margin of the corresponding transponded link.

The hub 12 runs on an algorithm to determine the desired signal strength may begin with the weakest signal, move on to the next weakest signal, and so on until all signals have been accounted for. This algorithm provides for treatment of multiple signals at once. By treating the weakest signal first, cancellation weak signals is minimized or eliminated. The uplink 24 signal power and downlink 22 signal power for each terminal 16 may be increased and/or decreased, as indicated by the method described herein.

Figure 2:
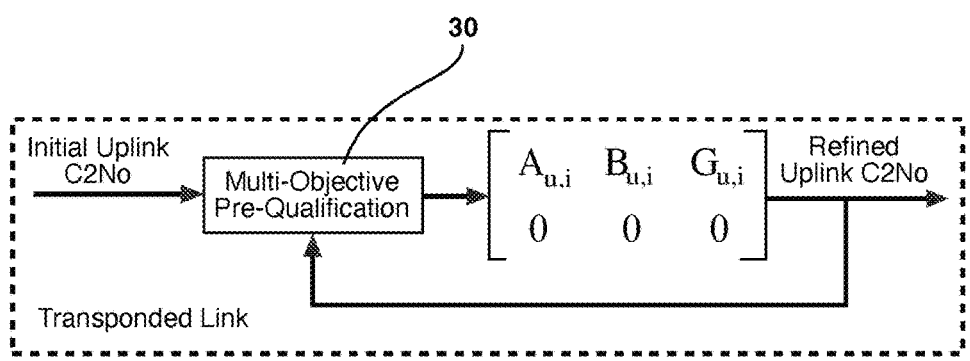
FIG. 2 is a state-space representation of uplink carrier to noise ratio dynamics in the form of an exemplary schematic diagram showing a control plane protocol of a control loop of an uplink signal, the signal being modified in response to feedback from respective downlink signals.

Referring to FIG. 2 uplink 24 power is controlled by an uplink 24 carrier power to noise ratio (UCNR). Three CNR's are considered: uplink 24 CNR for each terminal 16; downlink 22 CNR at the hub 12 and the combined uplink 24 CNR and downlink 22 CNR. The hub 12 demodulates the downlink 22 signal to determine the target usage of that signal and the associated power demand.

A maximum UCNR is determined according to the following equation:

$$C2No_{u,i}^{max} = C2No_{u,i} \frac{P_{T,i}^{max}}{P_{T,i}}, \qquad \text{Eq. 1}$$

wherein $C2No_{u,i}^{max}$ is the maximum uplink 24 carrier power to noise ratio density ratio for terminal 16 $i$, $C2No_{u,i}$ is the actual uplink 24 CNR for terminal 16 I and $$\frac{P_{T,i}^{max}}{P_{T,i}}$$

is the ratio of maximum power transmission to current power transmission associated with terminal 16 $i$.

A minimum DCNR for each terminal 16 is determined according to:

$$C2No_{d,i}^{min} = \left[C2No_{req,i}^{-1} - [[C2No_{u,i}^{max}]_{dB} - LM_{u,i}]_R^{-1}\right]^{-1}, \qquad \text{Eq. 2}$$

wherein $C2No_{d,i}^{min}$ is the minimum downlink 22 carrier power to noise ratio terminal 16 $i$ and $LM_{u,i}$ is the uplink 24 margin for terminal 16 $i$ and the minimum DCNR for the system 10 is determined by:

$$\Delta_d^{min} = \sum_{i=1}^{N} [[C2No_{d,i}^{min}]_{dB} + LM_{d,i}]_R, \qquad \text{Eq. 3}$$

wherein $\Delta_d^{min}$ is the minimum total downlink 22 CNR for an entire fleet of terminals 16

Under preferred operating conditions, an end-to-end power level, and associated link quality, may be 10 MBit/sec bandwidth is determined according to:

$$\delta_i = [[C2No_{u,i}^{max}]_{dB} - LM_{u,i}]_R^{-1} + [[C2No_d^{max}]_{dB} - LM_{d,i}]_R^{-1}, \qquad \text{Eq. 4}$$

wherein $\delta_i$ is the best link quality for the transponded link associated with terminal 16 $i$.

To begin the algorithm processed by the hub 12, the system 10 must meet three prequalifications 30: 1) adequate link supportability; 2) adequate downlink 22 CNR to support transponder 14 loading, i.e. transponder 14 loading feasibility and 3) a minimum DCNR to accommodate weaker considering total downlink 22 supportability and power robbing at the transponder 14 due to noise, i.e. total downlink 22 supportability in the presence of power robbing effects.

The prequalification 30 process for link supportability at the hub 12 is given by:

$$q_i = 1 - \frac{C2No_{req,i}^{-1}}{\delta_i}, i = 1, \ldots, N, \qquad \text{Eq. 5}$$

wherein $q_i$ is the link supportability indicator and $C2No_{req,i}^{-1}$ is the required level of CNR, in dB, for the desired waveform necessary to satisfy the link data rate requirement. Each prequalification 30 is individually referred to as a performance parameter and collectively as performance parameters.

The end to end CNR evaluation preferably considers the random losses given by:

$$Pr\{w_{u,i}(n) \leq LM_{u,i}(n)\} = 0.99, \qquad \text{Eq. 6}$$

wherein $Pr\{w_{u,i}(n) \leq LM_{u,i}(n)\}$ denotes event probability as defined below and $w_{u,i}(n)$ is the simulated random uplink 24 loss in dB, such that the simulated random uplink 24 loss in dB does not violate a 99% probability of weak signals being accommodated without dropping or being lost in favor of stronger signals, hereinafter referred to as the probability of return link closure. One of skill will recognize that the probability may be adjusted upwards or downwards, depending upon the degree of risk one is willing to take and the specific hub 12 under consideration. Thus the probability may range from 0.950 to 0.999, from 0.980 to 0.995, from 0.989 to 0.991 and is preferably 0.99.

UCNR Total downlink 22 supportability in the presence of power robbing effects, coupled with autonomous adjustments of uplink 24 CNRs, is the performance measure for dynamical control-theoretic framework and is given by the equation:

$$J_N(n_0) = \Sigma_{k=n_0+1}^{L} \{x_N^T(k) Q_N x_N(k) + u_N^T(k) R_N u_N(k)\}, \qquad \text{Eq. 7}$$

wherein $J_N(n_0)$ is a particular downlink 22 adjustment, $x_N^T$ is the aggregate vector of uplink 24 CNR and margin dynamics, $x_N^T(k) Q_N x_N(k)$ is the successive tracking of actual downlink 22 CNRs, inherent transponder 14 power robbing effects and the maximum total downlink 22 CNR, $u_N^T(k)$ represents the autonomous adjustments of aggregate uplink 24 CNR sequences, and $u_N^T(k) R_N u_N(k)$ is the closed loop feedback control sequence associated with dynamic resource allocation 50 autonomy. The first term in the preceding equation represents adjustments dictated by successive tracking of downlink 22 CNRs. The second term in the preceding equation represents autonomous adjustment of uplink 24 CNRs.

$x_N^T$ is given by:

$$x_N^T(n)Q_N x_N(n) = x_N^T(n)\begin{bmatrix} H_{u,1}^T \\ H_{u,2}^T \\ \vdots \\ H_{u,N}^T \end{bmatrix}[H_{u,1} \ H_{u,2} \ \ldots \ H_{u,N}]x_N(n),$$ Eq. (8)

wherein $x_{u,i}$ is the state vector of uplink 24 CNR dynamics and $$\begin{bmatrix} H_{u,1}^T \\ H_{u,2}^T \\ \vdots \\ H_{u,N}^T \end{bmatrix}[H_{u,1} \ H_{u,2} \ \ldots \ H_{u,N}]$$

is the positive semi-definite matrix of power losses.

Equation 8 is satisfied by automatically adjusting uplink 24 CNRs via dynamical feedback sequences of $u_N(k)$ per the allocation 50 epoch (via the term $u_N^T(k) R_N u_N(k)$ the prequalification 30 process as stated in the algorithm for dynamic resource allocation 50 for communication return link resource allocation 50 will be satisfied; via the first quadratic term of $x_N^T(k)Q_N x_N(k)$.

Transponder 14 loading feasibility is given by the equation:

$$Q_d = 1 - \frac{C2No_d^{max}}{\Delta_d^{min}},$$ Eq. 9 wherein $Q_d$ is transponder 14 loading feasibility loading indicator.

This equation is either satisfied or violated according to the bi-level/hybrid measure of potential breaches of the prequalification 30 process for each transponded link i.

Once all three of the above prequalification 30 criteria above are assessed, the hub 12 may execute the closed loop feedback algorithm, to detect, predict and then estimate the needed uplink 24 and downlink 22 power requirements for each terminal 16 communicating with the transponder 14. The algorithm may be thought of as three nested closed control loops. The inner control loop is a determination of the optimum terminal 16 uplink 24 power. The central control loop is a determination of the power needs at the transponder 14 to receive the proper signal from the terminal 16. The outer control loop is the error between the measured uplink 24 power at the terminal 16 and the needed uplink 24 power at the terminal 16.

The algorithm must consider power losses from equipment, transponder 14 aging, ambient noise, etc. Accordingly, the ground hub 12 may sum DCNRs from all terminals 16 to determine whether or not too much noise is present for the power level at a particular terminal 16 according to the following inequality, which dictates the supportability constraint of the transponder 14. The supportability constraint of the transponder 14 subject to noise power loss is given by:

$$\sum_{i=1}^{N} G^*[[C2No_{u,i}]_{dB} + LM_{u,i}]_R + G^*BW_{T_A} < C2No_d^{max}$$ Eq. 10 wherein $G^*$ is the largest transponder 14 gain associated with the corresponding weakest transponded link and $BW_{T_A}$ is the bandwidth of the transponder 14, and $C2No_d^{max}$ is the maximum downlink 22 CNR available at the hub 12.

Uplink 24 CNR dynamics for a plurality of transponded links subject to a multi-step prequalification 30 process is determined by the state equation:

$$x_N(n+1) = A_N(n)x_N(n) + B_N(n)u_N(n) + G_N w_N(n)$$ Eq. 11 wherein $x_N(n+1)$ is the total known variable loss at the hub 12 for any epoch, $A_N(n)x_N(n)$ is the aggregate state vector, $B_N(n)u_N(n)$ is the process noise vector and $G_N w_N(n)$ is the white Gaussian sequence.

Uplink 24 CNR dynamics for a specific transponded link i is quantified by:

$$x_{u,i}(n+1) = A_{u,i}(n)x_{u,i}(n) + B_{u,i}u_i(n) + G_{u,i}w_{u,i}(n).$$ Eq. 12

For each transponded uplink 24, the role of dynamic resource management by the hub 12 is further shown by a hybrid measure of potential breaches of the prequalification 30 processes for each transponded link i as determined according to:

$$m_{u,i} = \epsilon Q_d \text{sgn}(Q_d) + (1-\epsilon)q_i \text{sgn}(q_i); 0 < \epsilon < 1,$$ Eq. 13 wherein $\epsilon$ is the scaling factor of the actual aggregate downlink 22 carrier power to noise density ratio compared to the maximum total downlink 22 carrier power to noise density ratio and $Q_d \text{sgn}(Q_d)$ is the transponder 14 loading feasibility.

If the transponder 14 is overloaded and link supportability is not met, the value of $\epsilon Q_d \text{sgn}(Q_d) + (1-\epsilon) q_i \text{sgn}(q_i)$ will be positive and the uplink 24 will be curtailed. Otherwise, this value will be negative and uplink 24 can proceed.

Curtailment of the uplink 24 to the transponder 14 may be quantified according to the control algorithm:

$$[C2No_{u,i}]_{dB}(n+1) = [C2No_{u,i}]_{dB}(n) + \mu_i \{u_{C2No,i}(n) - m_{u,i}(n)[C2No_{u,i}]_{dB}(n)\}$$ Eq. 14 wherein $[C2No_{u,i}]_{dB}$ is the uplink 24 carrier power to noise density ratio in dB, integrated with multi-objective prequalification 30 processes $u_{C2N_{o,i}}$. It is to be understood that $u_{C2N_{o,i}}$ controls the amount of uplink 24 CNR increase per epoch iteration and $m_{u,i}$ is an adaptive measure of the amount of underloading or overloading of the transponder 14 as determined by the prequalification 30 process.

Figure 3:
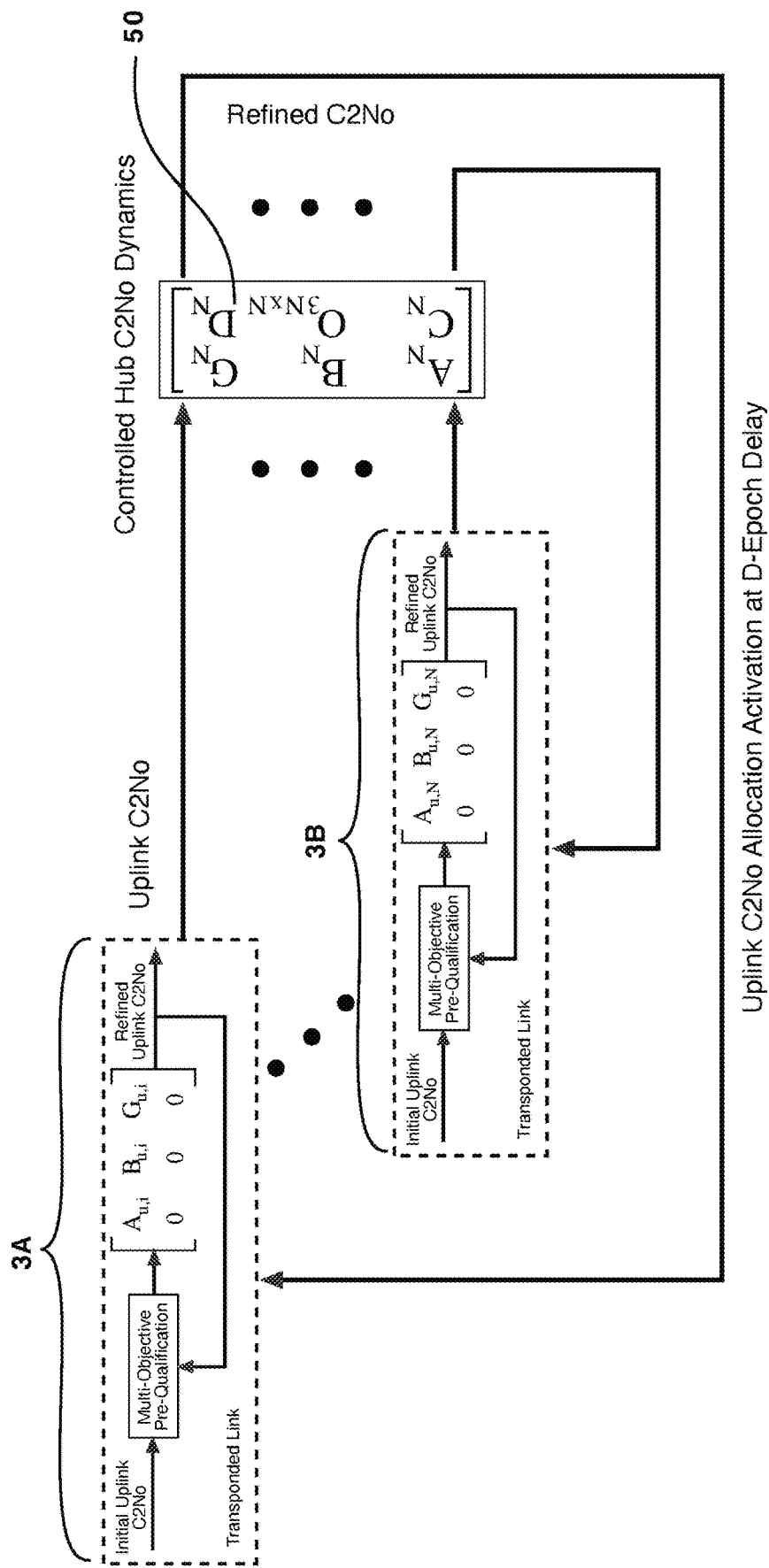
FIG. 3 is an exemplary schematic diagram showing a plurality of control plane protocols of control loops of plural uplink signals, the plural uplink signals being modified in response to modified downlink signals.
Figure 3A:
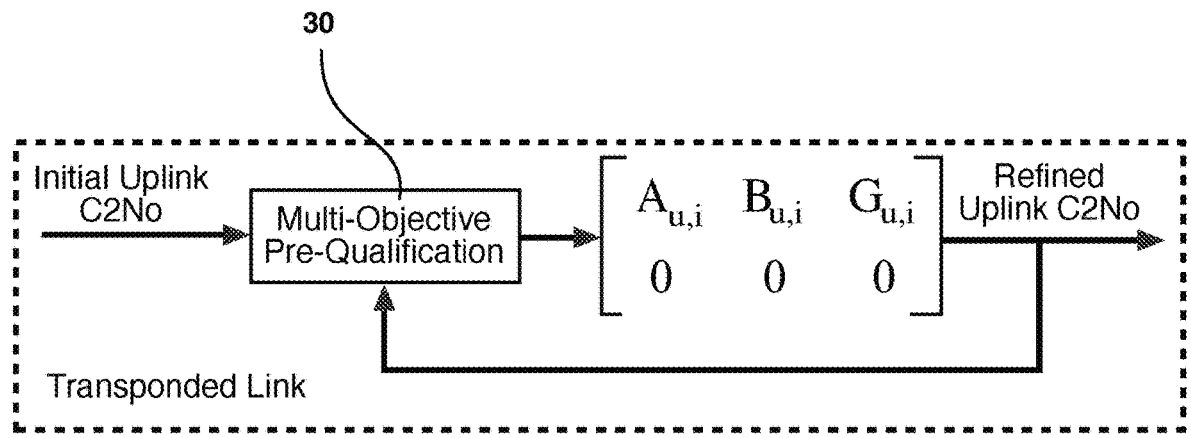
FIG. 3A is a representation of the control loop in the block designated as 3A in FIG. 3.
Figure 3B:
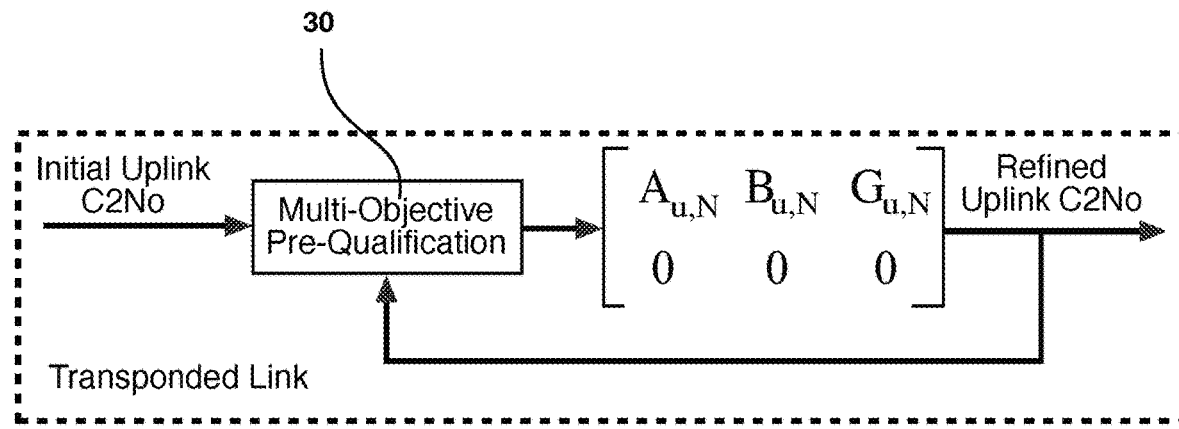
FIG. 3B is a representation of the control loop in the block designated as 3B in FIG. 3.

Referring to FIGS. 3, 3A and 3B, the hub 12 has multiple inputs and multiple outputs. Sensors at the hub 12 measure excitations responsive to the downlink 22 signals. The sensors provide a measurement of actual UCNR. The desired UNCR, as determined by Eq. 15.

The hub 12 may use a lookup table of burst modes, modulations and coding types for predetermined waveforms to determine the desired power assignment corresponding to a given terminal 16 according $[C2No_{u,i}]_{dB}(n)$ when the terminal 16 performs the return link communications. The change in uplink 24 power at the terminal 16 based upon the prequalification 30 criteria described above is given by $u_{C2N_{o,i}}(n)$, wherein $u_{C2N_{o,i}}$ is the increase in uplink 24 CNR for a given epoch i. The term $m_{u,i}(n)$ $[C2No_{u,i}]_{dB}$ represents a positive value if the terminal 16 has enough power to satisfy the new power assignment and a negative value if the terminal 16 does not have enough power to satisfy the assignment, wherein the amount of CNR underloading or overloading at the hub 12 is given by $m_{u,i}(n)$ $[C2No_{u,i}]_{dB}$.

The error between desired loading at the hub 12 and actual loading at the hub 12 is determined by subtracting the actual UCNR from the desired UCNR. The errors for each time epoch are summed using matrix analysis according to Eq. 8.

The CNR error is minimized to provide maximum power for each terminal 16. If the CNR error becomes too large, saturation of the hub 12 may occur, leading to clipping of the uplink 24 power for one or more terminals 16. The method described herein provides the maximum uplink 24 power for each terminal 16.

Thus the hub 12 controls the UCNR of all terminals 16 through dynamic resource allocation 50 for the ground hub 12 using closed loop feedback control. The closed loop sequence provides for autonomous adjustment of UCNR within a Chi-square randomness sub-algorithm determined by Eq. 7 above. This equation provides the total adjustment for all terminals 16 under consideration at a particular time. Individual terminal 16 power assignments are determined by Eq. 14 as discussed above.

Using a Chi-square sub-algorithm assignment prevents the hub 12 from increasing power level for a particular terminal 16 too fast, thereby preventing that terminal 16 from robbing an adjacent terminal 16 of necessary power. Likewise, the Chi-square sub-algorithm assignment prevents the hub 12 from decreasing power level for a particular terminal 16 too slow, thereby minimizing intermodulation distortion.

Figure 4:
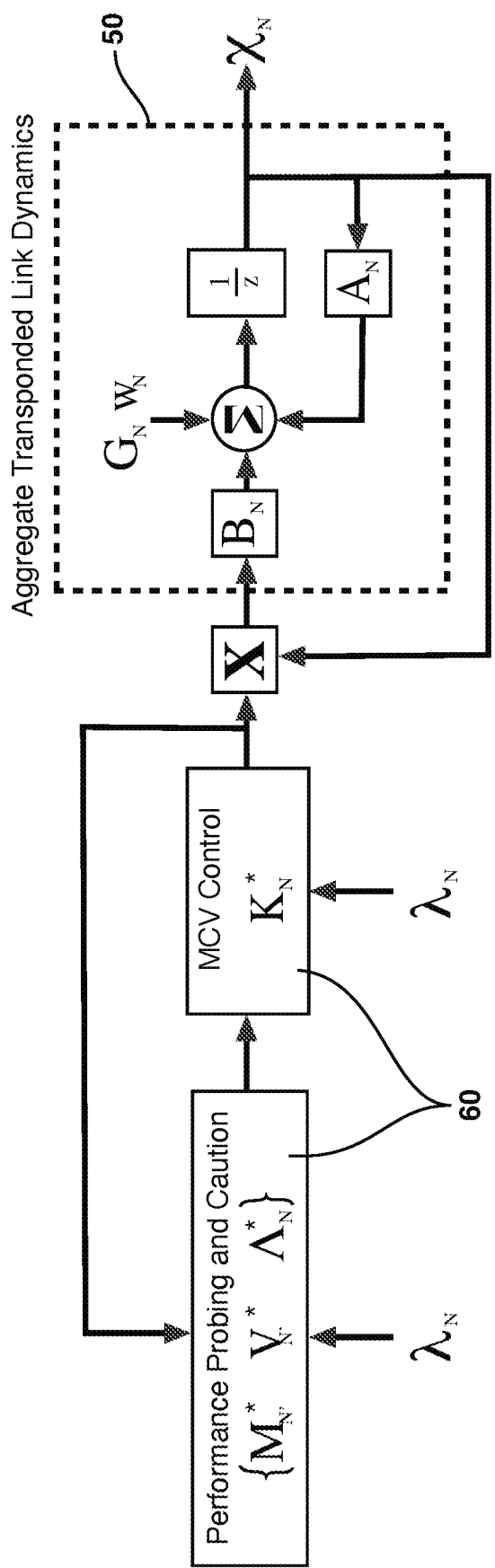
FIG. 4 is an exemplary schematic diagram of a control loop of minimal cost variance control for uplink carrier power noise density ratio adjustments in response to minimizing performance uncertainty of a plurality of transponded links.
Figure 5:
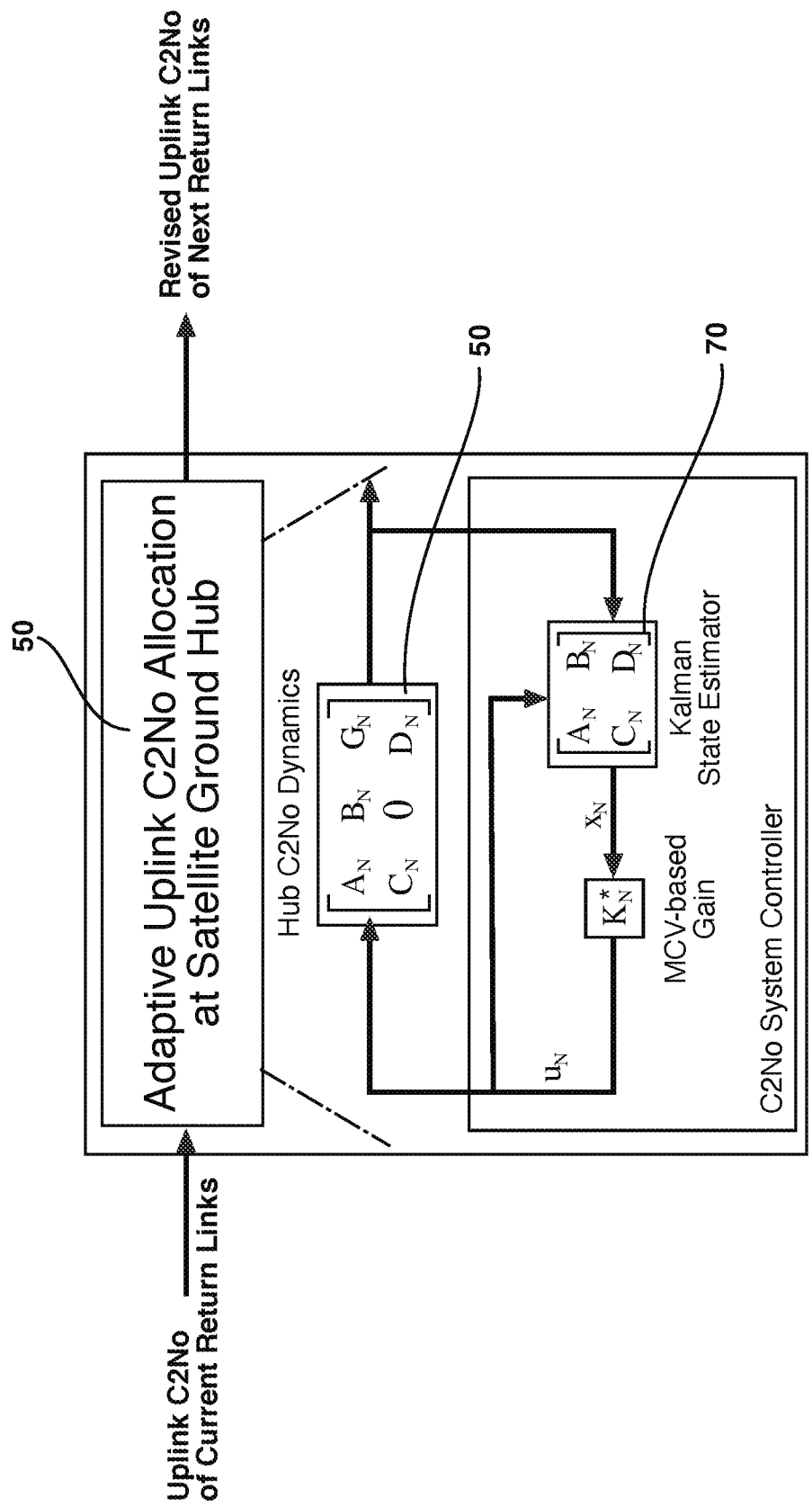
FIG. 5 is an exemplary schematic diagram of an exemplary schematic diagram showing dynamic resource allocation of a state-estimate-feedback control loop of a hub using a Kalman filter to perform minimal cost variance control.

Referring to FIGS. 4 and 5, the uplink 24 CNR adjustment may be performed according to a minimal variance algorithm 60 (MVA) designated $\gamma^*_N(k)$. As used herein a MVA 60 refers to a type of algorithm wherein minimization of the equation:

$$\gamma_N^*(k) = K_N^*(k)x_N(k) = u_N(k) \qquad \text{Eq. 15}$$

is used to determine a particular adjustment and wherein $K_N^*(k) = -[B_N^T \Lambda_N(k) B_N + \mu_N(k) R_N]^{-1} B_N^T \Lambda_N(k)$
$A_N(k)$ and $\Lambda_N(k) = S_N(k) G_N W_N G_N^T S^N(k) + \frac{1}{4} V_N(k+1) + \mu_N(k) S_N(k),$
for $n_0 \le k \le L-1$.

Execution of Equation 15 minimizes the variance of performance and further minimizes adjustments of the UCNR. This arrangement provides for better control of the UCNR adjustments, fine tuning of the UNCR adjustments and less overshoot than occurs without a minimization algorithm. Minimizing the UNCR adjustments, will minimize the magnitudes of $J_N(n_0)$ in Equation 7.

The variance of performance minimization may be accomplished using a Kalman estimator of UCNR dynamics. Noisy measurements can be made according to Eq. 11 above to produce the state estimates according to Eq. 8 above. A highly preferred estimate of the state in Eq. 11 can be made using a Kalman filter 70. A Kalman filter 70 reduces uncertainty due to noise inherent in, e.g. sensor data and random external factors, by using a linear quadratic estimation in a series of measurements in different epochs. Recursive guidance is used to predict estimated error covariance as set forth in an initial filter 70 estimate given by:

$$\hat{x}_N(n_0|n_0) = x_N(n_0) + P_0 C_N^T [C_N P_0 C_N^T + V_N(n_0)]^{-1} [y_N(n_0) - C_N x_N(n_0)]. \qquad \text{Eq. 16}$$

The initial step in the preceding equation is preferably taken as 0.

According to the present invention, there is a method of allocating signal resources from a transponder to a plurality of terminals remote therefrom, the method comprising the steps of: providing a system comprising a transponder in bilateral signal communication with each of a hub and a first plurality of terminals; downlinking a first plurality of links from the hub to the first plurality of terminals; then determining whether or not the system meets prequalification criteria for the for the hub by assessing whether or not the system A) has an adequate link supportability, B) has an adequate downlink CNR to support a transponder loading feasibility and C) has a minimum DCNR total downlink supportability ratio. If the determination is yes, then then proceed to a control algorithm with no step change in a CNR allocation from the transponder. If the determination is no, then proceed to a control algorithm for adjusting a UCNR allocation, wherein the control algorithm allocates power from the transponder without reducing the number of links in the first plurality of links.

This method may further comprising the steps of: identifying transponded links from the transponder at predetermined time epochs for return link access allocation, determining an underloading or an overloading of the transponder as determined by the prequalification step A and C and adjusting a plurality of uplink CNRs at a corresponding plurality of predetermined epochs for return link access allocation.

The method according to the preceding paragraph may provide for the underloading and the overloading of the transponder to be determined according to a plurality terminal transmission power levels corresponding to the plurality of terminals. The step of adjusting the uplink CNRs may consider at least one of uplink margins and the probability of return link closure.

The method according to the preceding paragraph may consider the probability of return link closure in the range of 0.950 to 0.999 and more preferably in the range of 0.989 to 0.991 and even more preferably 0.90.

In another aspect, the method of allocating signal resources from a transponder to a plurality of terminals remote therefrom comprises the steps of: providing a system comprising a transponder in bilateral signal communication with each of a hub and a plurality of terminals; determining a plurality of transponder signal gains corresponding to a like plurality of terminals receiving signals from the transponder; selecting a largest transponder gain from the plurality of transponder gains; matching the largest transponder gain to a corresponding weakest transponded link; and autonomously increasing the UCNR of the weakest transponded link such that a maximum UCNR is not exceeded.

The method according to the preceding paragraph may further comprise the steps of computing a maximum DCNR; monitoring aggregate downlink CNR; and autonomously adjusting aggregate DCNR to not exceed the maximum DCNR to be supported by the transponder. This method may further comprise the steps of defining a plurality of random losses and autonomously adapting the UCNR to compensate for the plurality of random losses.

In another aspect the method of allocating signal resources from a transponder to a plurality of terminals remote therefrom comprises the steps of: providing a system comprising a transponder in bilateral signal communication with each of a hub and a plurality of terminals and determining whether or not the system meets prequalification criteria for the for the hub by assessing whether or not the system A) has an adequate link supportability, B) has an adequate downlink CNR to support a transponder loading feasibility and C) has a minimum DCNR sufficient to prevent link closure with a total downlink supportability, and the noise power losses at the transponder to comprise three distinct performance parameters. If the assessment is yes, then proceed to a control algorithm with no step change in an CNR allocation from the transponder. If the assessment is no, then proceed to a control algorithm for adjusting a UCNR allocation from the transponder.

The method according to the preceding paragraph may further comprise the steps of: assigning an epoch for monitoring each link from the transponder, the epochs collectively comprising a plurality of epochs; determining a number of UCNR adjustments for each epoch; and minimizing the number of UCNR adjustments for the plurality of epochs. And this method may further comprise the steps of minimizing the variance of the prequalification parameters in steps A, B and C.

The method according to the preceding paragraph may comprise at least one step of minimizing the variance of the performance parameters according to a minimal variance algorithm.

The method according to the preceding paragraph may further comprise the step of computing a mean constraint of at least one of the performance parameters for predetermined adjustments of the UCNR and adjusting a plurality of corresponding UCNR segments links for a like plurality of transponded links.

The method according to the preceding paragraph may further comprise the step of aggregating the mean constraints and computing the variance of at least one of the corresponding performance parameters; and autonomously adjusting a plurality of UCNR segments to minimize the variance of at least one of the performance parameters.

The method according to the preceding paragraph may comprise the step of minimizing the variance of at least one performance parameter by minimizing the variance of the three performance parameters. This method may comprise the step of minimizing the variance of at least one performance parameter by using a minimal variance algorithm to determine the future adjustment to UNCR.

The method according to the preceding paragraph wherein the step of using a minimal variance algorithm comprises using a Kalman filter to estimate UCNR.

The method according to the preceding paragraph may further comprise the step of predicting a covariance of errors of each of the estimates of the UCNRs and adjusting the Kalman filter to minimize the covariance of the errors.

Figure 6A:
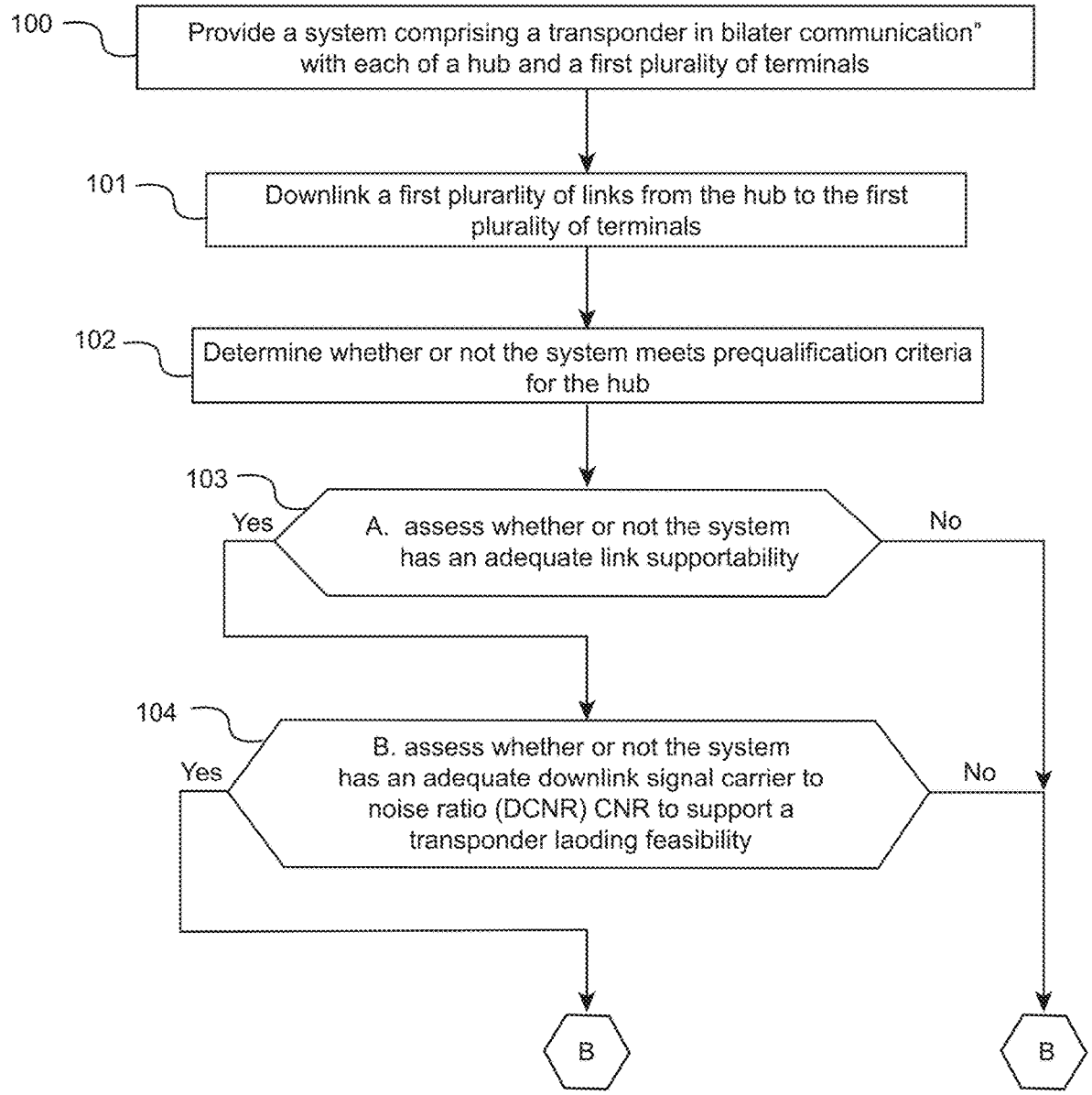
FIG. 6 is a flow chart of the steps of one aspect of the invention comprised of FIG. 6A and FIG. 6B.
Figure 6B:
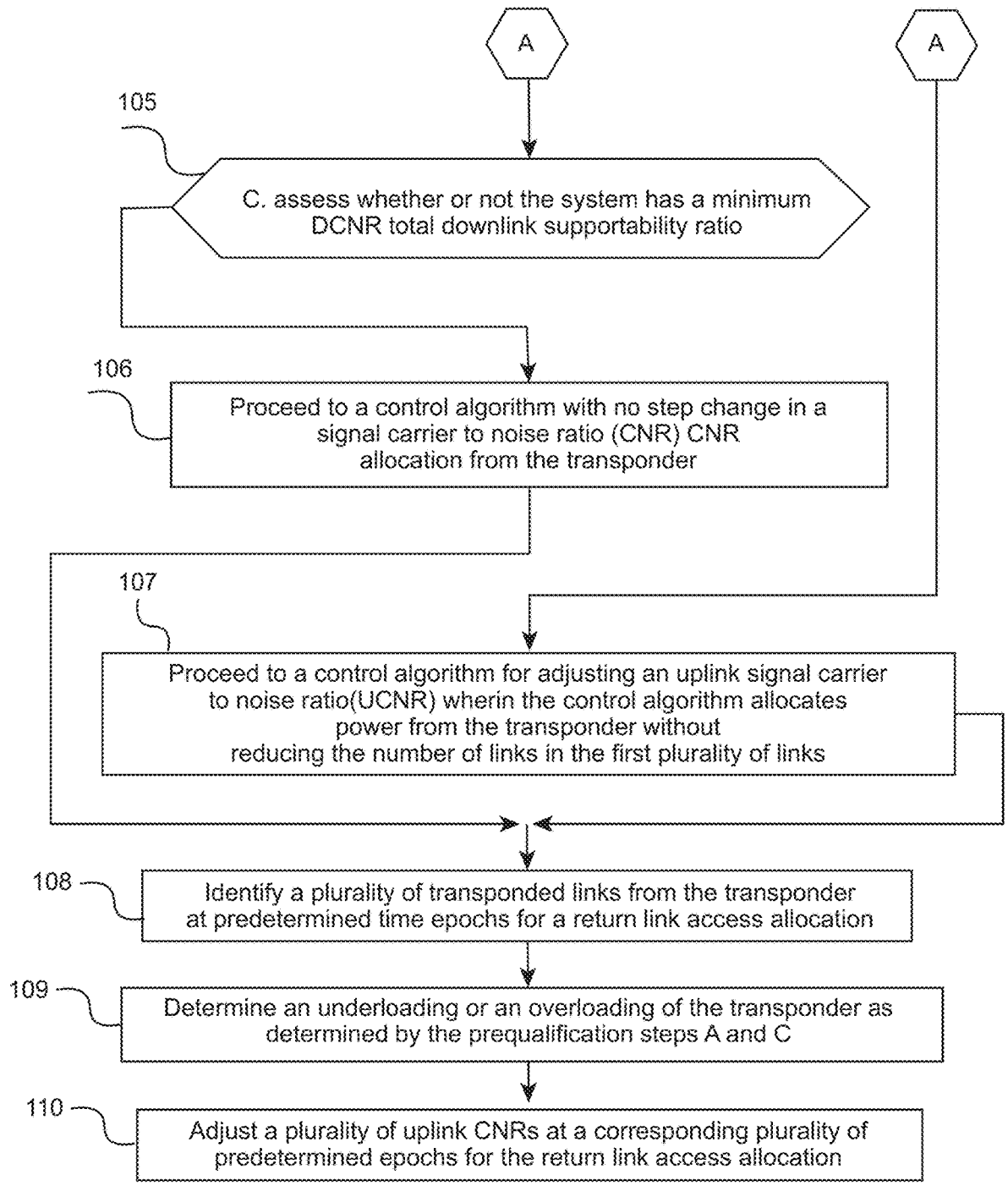

Referring to FIG. 6, in one aspect the invention comprises a method of allocating signal resources from a transponder to a plurality of terminals remote therefrom. The method comprises steps of: providing a system comprising a transponder in bilateral signal communication with each of a hub and a first plurality of terminals 100; downlinking a first plurality of links from the hub to the first plurality of terminals 101; determining whether or not the system meets prequalification criteria for the for the hub 102 by assessing and making a determination whether or not the system A) has an adequate link supportability 103, B) has an adequate downlink signal carrier to noise ratio (DCNR) 104 to support a transponder loading feasibility and C) has a minimum DCNR total downlink supportability ratio 105.

If the determination is yes to each of A, B and C, then the method proceeds to a control algorithm with no step change in a signal carrier to noise ratio (CNR) allocation from the transponder 106. If the determination is no to any one of A, B or C, then the method proceeds to a control algorithm for adjusting an uplink signal carrier to noise ratio (UCNR), wherein the control algorithm considers uplink margin and allocates power from the transponder without reducing the number of links in the first plurality of links 107.

The method may further comprise steps of identifying a plurality of transponded links from the transponder at predetermined time epochs for a return link access allocation 108, determining an underloading or an overloading of the transponder as determined by the prequalification steps A and C 109 and adjusting a plurality of uplink CNRs at a corresponding plurality of predetermined epochs for the return link access allocation 110.

Figure 7A:
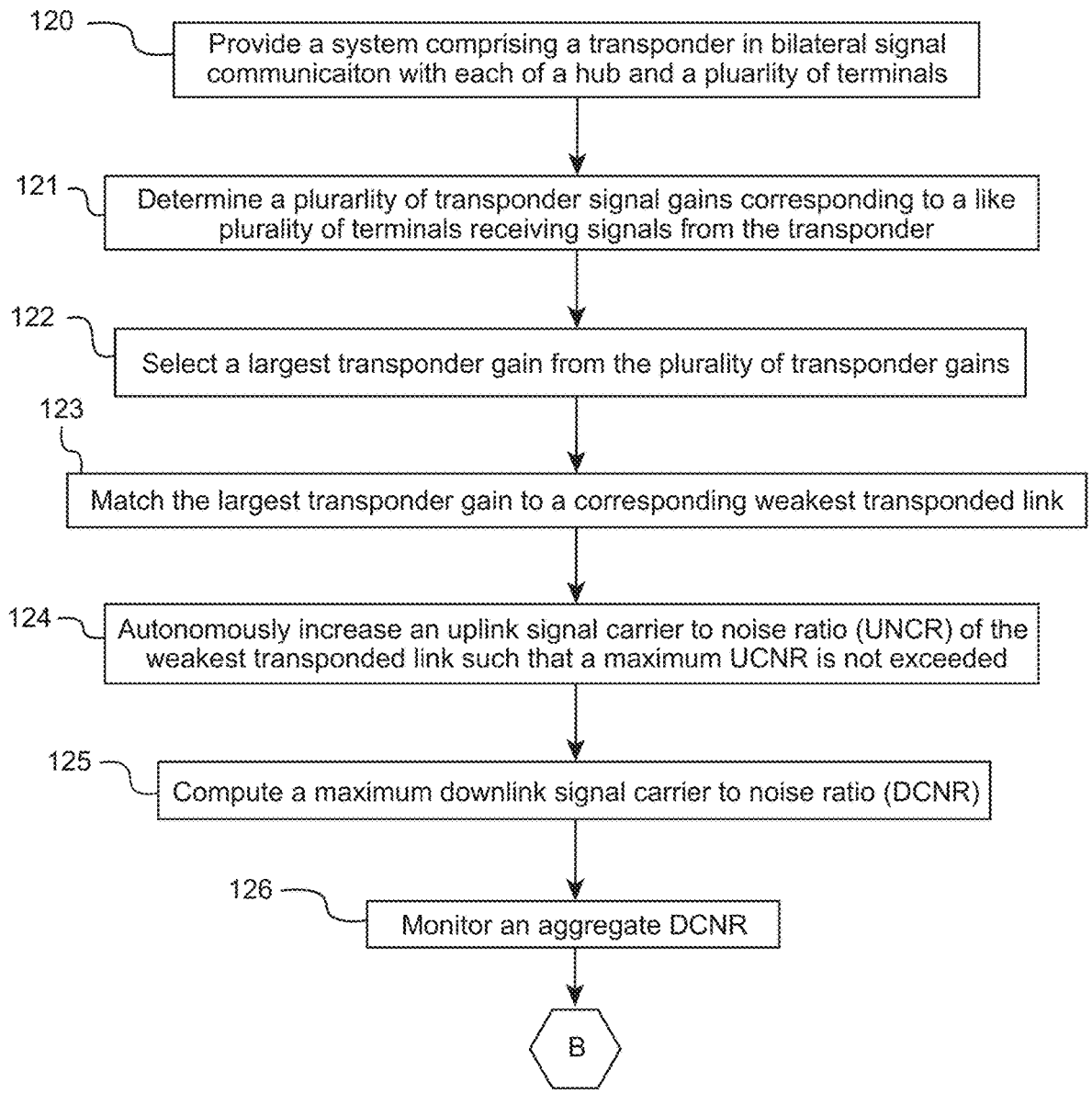
FIG. 7 is a flow chart of the steps of one aspect of the invention comprised of FIG. 7A and FIG. 7B.
Figure 7B:
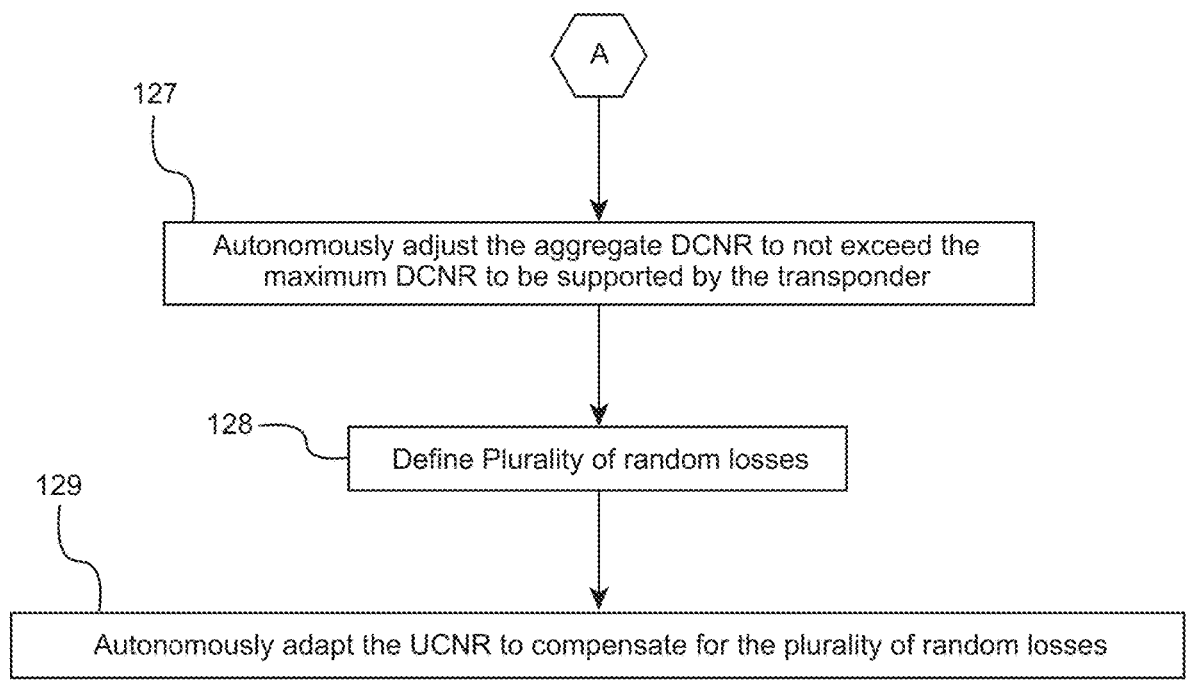

Referring to FIG. 7, in one aspect the invention comprises a method of allocating signal resources from a transponder to a plurality of terminals remote therefrom. The method comprises steps of: providing a system comprising a transponder in bilateral signal communication with each of a hub and a plurality of terminals 120; determining a plurality of transponder signal gains corresponding to a like plurality of terminals receiving signals from the transponder 121; selecting a largest transponder gain from the plurality of transponder gains 122; matching the largest transponder gain to a corresponding weakest transponded link 123; and autonomously increasing an uplink signal carrier to noise ratio (UCNR) of the weakest transponded link such that a maximum UCNR is not exceeded 124.

The method may further comprise steps of computing a maximum downlink signal carrier to noise ratio (DCNR) 125; monitoring an aggregate DCNR 126; and autonomously adjusting the aggregate DCNR to not exceed the maximum DCNR to be supported by the transponder 127. The method may further comprise steps of defining a plurality of random losses 128 and autonomously adapting the UCNR to compensate for the plurality of random losses 129.

Figure 8A:
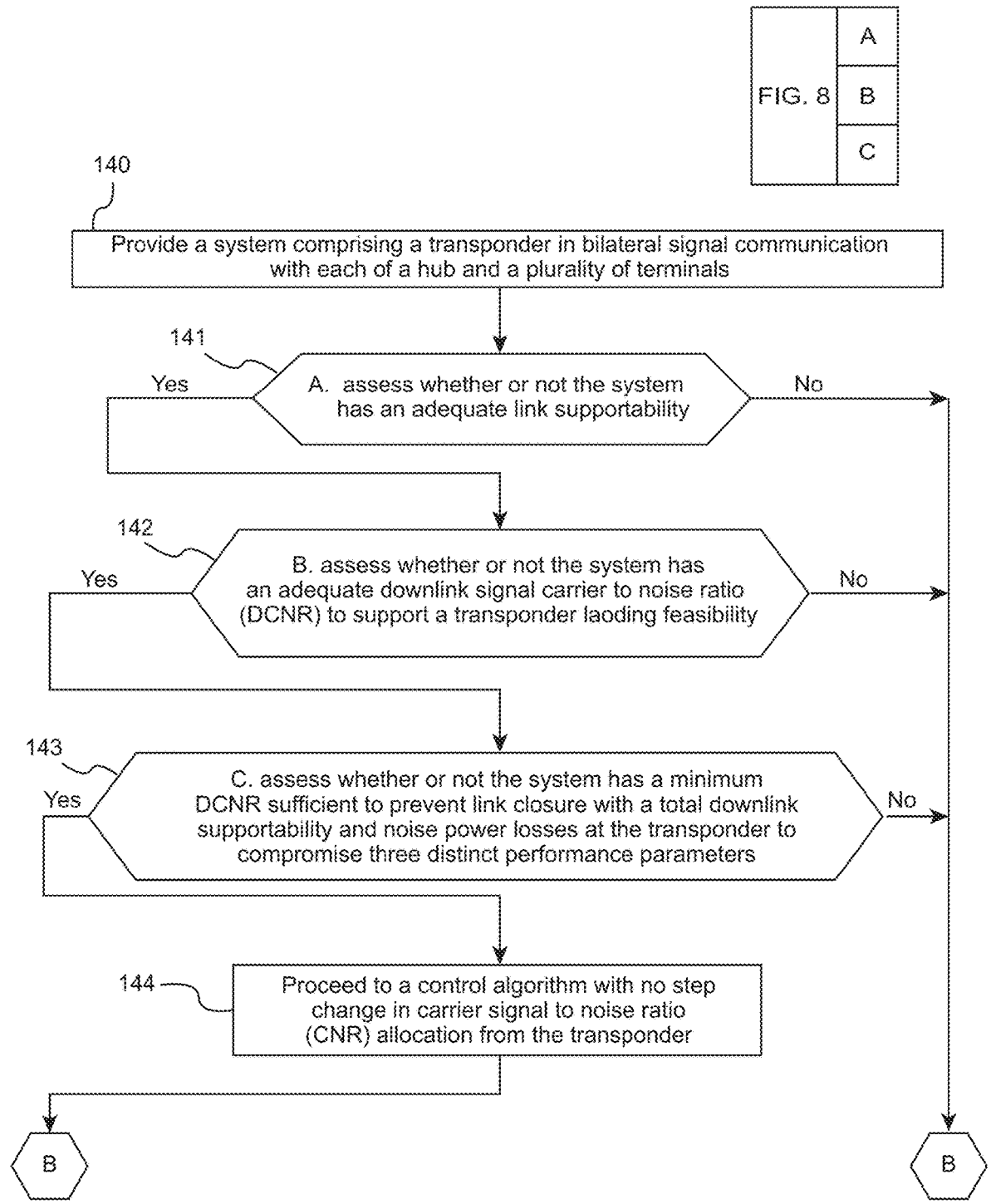
FIG. 8 is a flow chart of the steps of one aspect of the invention comprised of FIG. 8A, FIG. 8B and FIG. 8C.
Figure 8B:
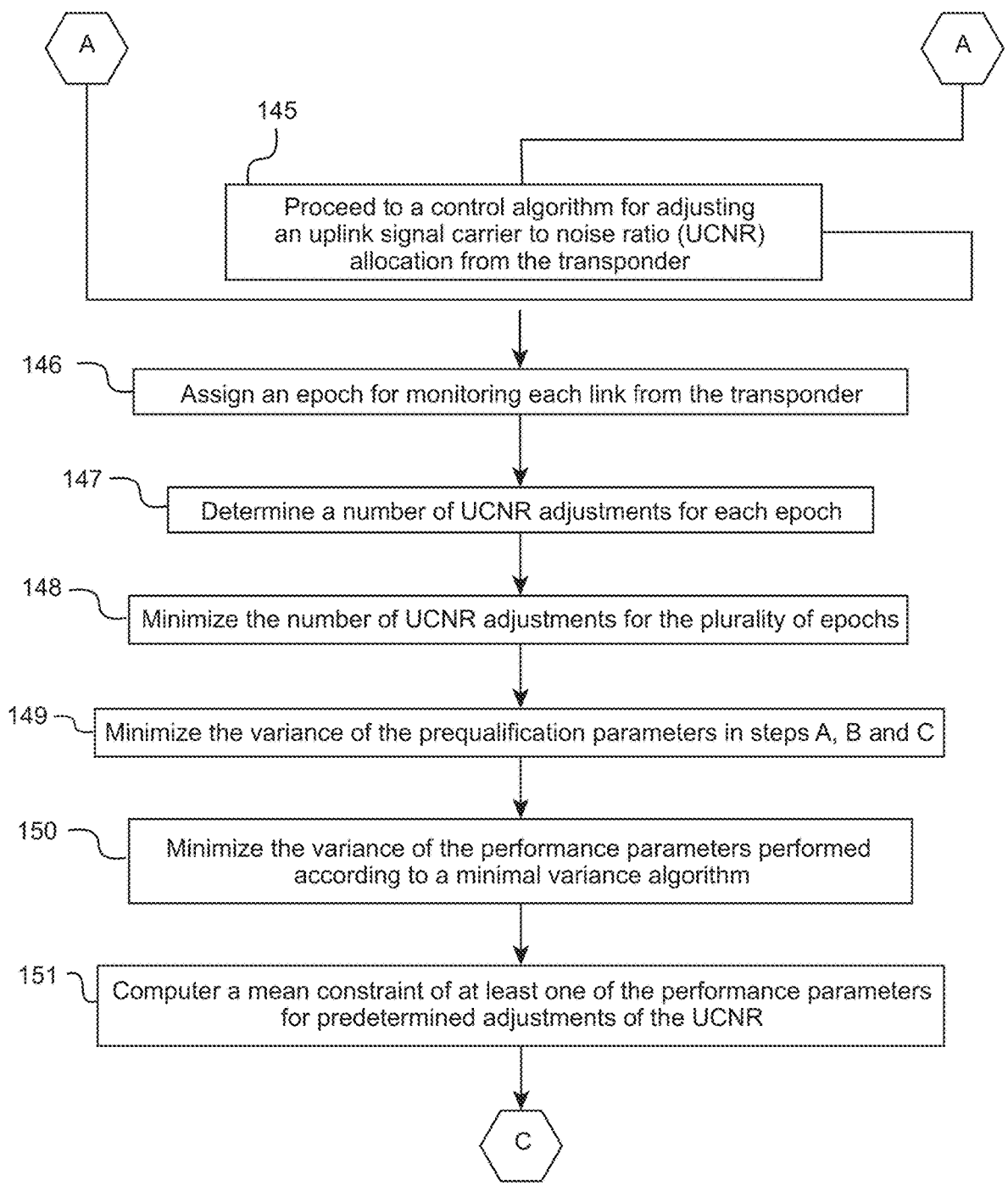
Figure 8C:
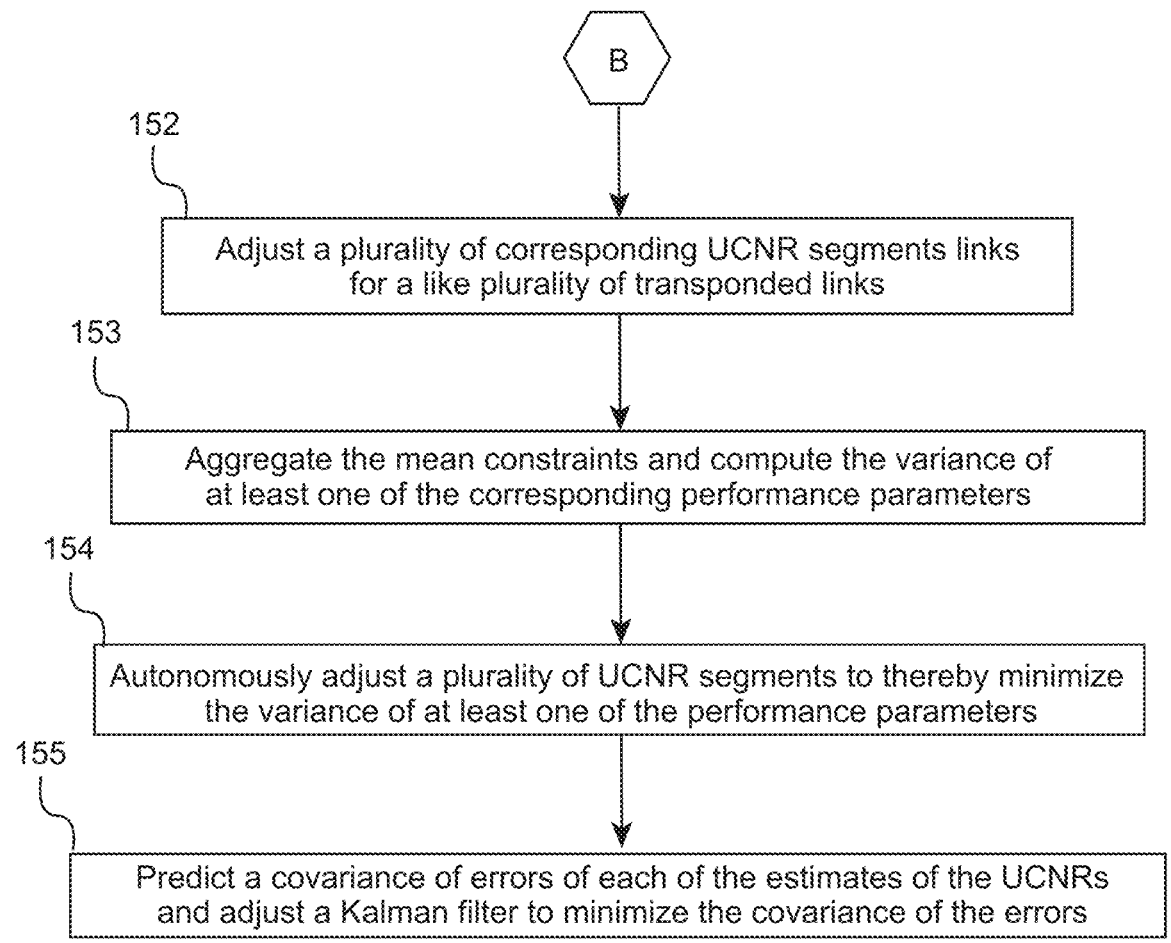

Referring to FIG. 8, in one aspect the invention comprises a method of allocating signal resources from a transponder to a plurality of terminals remote therefrom. The method comprises steps of: providing a system comprising a transponder in bilateral signal communication with each of a hub and a plurality of terminals 140; making a determination whether or not the system meets prequalification criteria for the for the hub by assessing whether or not the system A) has an adequate link supportability 141, B) has an adequate downlink signal carrier to noise ratio (DCNR) to support a transponder loading feasibility 142 and C) has a minimum DCNR sufficient to prevent link closure with a total downlink supportability, and the noise power losses at the transponder to comprise three distinct performance parameters 143. If the determination is yes to each of A, B and C, then proceeding to a control algorithm with no step change in a carrier signal to noise ratio (CNR) allocation from the transponder 144, if no, then proceeding to a control algorithm for adjusting an uplink signal carrier to noise ratio (UCNR) allocation from the transponder 145.

The method may further comprise steps of: assigning an epoch for monitoring each link from the transponder, the epochs collectively comprising a plurality of epochs 146; determining a number of UCNR adjustments for each epoch 147 and minimizing the number of UCNR adjustments for the plurality of epochs 148. The method may further comprise the step of minimizing the variance of the prequalification parameters in steps A, B and C 149. The method may further comprise the step of minimizing the variance of the performance parameters is performed according to a minimal variance algorithm 150. The method may further comprise steps of computing a mean constraint of at least one of the performance parameters for predetermined adjustments of the UCNR 151 and adjusting a plurality of corresponding UCNR segment links for a like plurality of transponded links 152. The method may further comprise steps of aggregating the mean constraints and computing the variance of at least one of the corresponding performance parameters 153; and autonomously adjusting a plurality of UCNR segments to thereby minimize the variance of at least one of the performance parameters 154. The method may further comprise steps of predicting a covariance of errors of each of the estimates of the UCNRs and adjusting the Kalman filter to minimize the covariance of the errors 155.

The invention is limited only by the appended claims and includes all variations and equivalents thereof.

What is claimed is:

1. A method of allocating signal resources from a transponder to a plurality of terminals remote from the transponder, the method comprising steps of:
providing a system comprising a transponder in bilateral signal communication with each of a hub and a first plurality of terminals;
downlinking a first plurality of links from the hub to the first plurality of terminals;
determining whether or not the system meets prequalification criteria for the hub by making an assessment of whether or not the system: A) has an adequate link supportability; B) has an adequate downlink signal carrier to noise ratio (DCNR) to support a transponder loading feasibility; and C) has a minimum DCNR total supportability ratio;
if the assessment is YES to each of prequalification steps of A, B and C, then proceeding to a first control algorithm with no step change in a signal carrier to noise ratio (CNR) allocation from the transponder; and
if the assessment is NO to at least one of the prequalification steps of A, B and C, then proceeding to a second control algorithm for adjusting an uplink signal carrier to noise ratio (UCNR), wherein the second control algorithm allocates power from the transponder without reducing a number of links in the first plurality of links, wherein the adjusting the UCNR considers uplink margins.

2. The method according to claim 1, further comprising:
identifying a plurality of transponded links from the transponder at a plurality of predetermined time epochs for a return link access allocation;
determining an underloading or an overloading of the transponder as determined by the prequalification steps of A and C; and
adjusting a plurality of UCNRs including the UCNR at a corresponding plurality of predetermined time epochs for the return link access allocation.

3. The method according to claim 2, wherein the underloading and the overloading of the transponder are determined according to a plurality of terminal transmission power levels corresponding to the plurality of terminals.

4. The method according to claim 2, wherein the step of adjusting the UCNRs further considers a probability of return link closure.

5. The method according to claim 4, wherein the method considers the probability of return link closure range of 0.950 to 0.999.

6. The method according to claim 5, wherein the method considers the probability of return link closure in a range of 0.989 to 0.991.

7. The method according to claim 6, further comprising;
defining a plurality of random losses; and
autonomously adjusting the UCNRs to compensate for the plurality of random losses.

8. A method of allocating signal resources from a transponder to a plurality of terminals remote from the transponder, the method comprising steps of:
providing a system comprising a transponder in bilateral signal communication with each of a hub and a plurality of terminals;
determining whether or not the system meets prequalification criteria for the hub by making an assessment of whether or not the system; A) has an adequate link supportability; B) has an adequate first downlink signal carrier to noise ratio (DCNR) to support a transponder loading feasibility; and C) has a second DCNR sufficient to prevent link closure;
if the assessment is YES to each of prequalification steps of A, B and C, then proceeding to a first control algorithm with no step change in a carrier signal to noise ratio (CNR) allocation from the transponder;
if the assessment is NO to at least one of the prequalification steps of A, B and C, then proceeding to a second control algorithm for adjusting an uplink signal carrier to noise ratio (UCNR) from the transponder;
computing and aggregating mean constraints for each of the adequate link supportability, the adequate first DCNR and the second DCNR;
computing variances of each of the adequate link supportability, the adequate first DCNR and the second DCNR; and
autonomously adjusting a plurality of UCNRs to thereby minimize the variances of each of the adequate link supportability, the adequate first DCNR and the second DCNR A.

9. The method according to claim 8, further comprising:
assigning an epoch of a plurality of epochs for monitoring each link from the transponder;
determining a number of UCNR adjustments for each epoch; and
minimizing the number of UCNR adjustments for the plurality of epochs.

10. The method according to claim 8, wherein at least one step of minimizing the variances is performed according to a minimal variance algorithm.

11. The method according to claim 8, wherein the minimizing the variances comprises using a minimal variance algorithm to determine a future adjustment to the UNCRs.

12. The method according to claim 11, wherein the using the minimal variance algorithm comprises using a Kalman filter to estimate the UCNRs.

13. The method according to claim 12, further comprising: predicting a covariance of errors of each of the estimates of the UCNRs and adjusting the Kalman filter to minimize the covariance of the errors.

* * * * *